(12) United States Patent
Jiao et al.

(10) Patent No.: US 7,509,247 B2
(45) Date of Patent: Mar. 24, 2009

(54) ELECTROMAGNETIC SOLUTIONS FOR FULL-CHIP ANALYSIS

(75) Inventors: Dan Jiao, Santa Clara, CA (US); Changhong Dai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 11/098,538

(22) Filed: Apr. 5, 2005

(65) Prior Publication Data

US 2006/0224373 A1     Oct. 5, 2006

(51) Int. Cl.
G06F 7/60       (2006.01)
G06F 17/50      (2006.01)
G06F 9/45       (2006.01)

(52) U.S. Cl. .................... 703/14; 703/2; 716/1; 716/7; 716/8

(58) Field of Classification Search ............... 703/14, 703/2

See application file for complete search history.

(56) References Cited

U.S. PATENT DOCUMENTS 6,775,807 B2 *   8/2004   Lowther et al. ............. 716/1
2004/0082230 A1  4/2004   Jiao et al.
2004/0243373 A1* 12/2004  Sercu et al. .............. 703/14

OTHER PUBLICATIONS

"Projection-Based Approaches for Model Reduction of Weakly Non-linear, Time-Varying Systems", Joel R. Phillips. IEEE Transactions on Computer-Aided Design of Integrated Circuits and Systems, vol. 22, No. 2, Feb. 2003.*

Dan Jiao et al., "Computational Electromagnetics for High-Frequency IC Design;" date no earlier than 2003.

Dan Jiao et al.; "A Novel Technique for Full-wave Modeling of Large-scale Three-dimensional High-speed On/Off-chip Interconnect Structures;" 2003 IEEE; pp. 39-42.

Per G. Sverdrup et al. "Sub-Continuum Thermal Simulations of Deep-Sub-Micron Devices under ESD Conditions;" International Conference on Simulation of Semiconductor Processes and Devices (SISPAD), Sep. 6-8, 2000, Seattle, WA, pp. 54-57.

Sharad Kapur et al., "Efficient Full-Wave Simulation in Layered, Lossy Media;" Bell Laboratories, Lucent Technologies & University of California, Santa Cruz, CA; date no earlier than Nov. 1997.

* cited by examiner

Primary Examiner—Paul L Rodriguez
Assistant Examiner—Nithya Janakiraman
(74) Attorney, Agent, or Firm—Ked & Associates, LLP (57) ABSTRACT

A modeling method is provided that includes receiving a computational model of a structure and slicing the computational model into a plurality of circuit prints. The plurality of slices may include essential circuit prints and backfill circuit prints. Various unknowns may be eliminated between essential circuit prints of the computational model. The unknowns to be eliminated may include volume unknowns and backfill circuit-print unknowns. The numerical system formed by circuit-print unknowns may be divided into a plurality of blocks. The blocks may be solved in turn. One block may be solved by projecting the contributions from other blocks to this block. The solution of the one block may be translated to other blocks to solve unknowns therein. The computational model may then be solved to determine electromagnetic and circuit characteristics of the structure.

21 Claims, 9 Drawing Sheets

ELECTROMAGNETIC SOLUTIONS FOR FULL-CHIP ANALYSIS

FIELD

Embodiments of the present invention may relate to circuit design. More particularly, embodiments of the present invention may relate to large scale full-wave analysis and large scale circuit modeling.

BACKGROUND

High-frequency digital, mixed signal and radio frequency (RF) integrated circuit (IC) design may demand accurate full-wave analyses for pre-layout design optimization and post-layout performance verification. However, full-wave modeling techniques may suffer from large memory requirements and long processor run time. Although algorithms have been studied to mitigate this problem, an integral equation solver may still need O(NlogN) operations and O(NlogN) storage to deal with N-unknown problems; a partial-differential-equation based solver may scale as O(N) in both memory requirement and processor cost. This performance may be regarded as a limit that one can achieve in computational electromagnetics. Since N may be an extremely large number in large-scale IC analysis, the performance of existing full-wave modeling techniques may not be sufficient for realistic high frequency IC design.

The problem may be solved by full-wave modeling and simulation techniques that have limited capacity. For example, commercial tools may be provided within a full-wave-based computer aided design (CAD) market. One tool may be a surface-based integral equation solver. However, its use may be restricted to component design as its computation may be very expensive when the number of surface unknowns exceeds a few thousand. Another tool may be a finite-element-based solver that conducts volumetric discretization. Although the resultant matrix may be sparse, the solution may become difficult if a large number of volume unknowns are involved. The limited capability may prevent the use of existing full-wave techniques in large-scale IC analysis such as pre-layout design of global circuitry and post-layout performance verification. As a result, designers may have to rely on empirical, less-accurate, or inefficient methods in high-frequency digital, mixed signal and RF IC design.

BRIEF DESCRIPTION OF THE DRAWINGS

The foregoing and a better understanding of embodiments of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and embodiments of the invention are not limited thereto.

The following represents brief descriptions of the drawings in which like reference numerals represent like elements and wherein.

DETAILED DESCRIPTION

In the following detailed description, like reference numerals and characters may be used to designate identical, corresponding or similar components in differing figure drawings. Further, in the detailed description to follow, example sizes/models/values/ranges may be given although the present invention is not limited to the same. Where specific details are set forth in order to describe example embodiments of the invention, it should be apparent to one skilled in the art that the invention can be practiced without these specific details.

Embodiments of the present invention may provide a circuit-print projection-translation method and a high-capacity circuit-abstracted electromagnetic solution. This may be provided for efficient full-wave analyses of very large-scale such as full-chip-scale digital, mixed signal, and RF integrated circuits.

Embodiments of the present invention may also provide a method that breaks through the limits in problem sizes in computational electromagnetics (EM) for high-frequency IC design. Embodiments of the present invention may provide an accurate solution irrespective of problem sizes. In addition, embodiments of the present invention may provide a circuit-abstracted electromagnetic solution. That is, one example embodiment may formulate a circuit abstraction of the original Maxwell's system to achieve an efficient and seamless transition from fields to circuits. Stated differently, rather than formulating an electromagnetic solution at any point inside a circuit system, an embodiment of the present invention may form a circuit abstraction of the original field system. The abstracted system may only involve field unknowns that contribute to the final circuit extraction.

Embodiments of the present invention may also provide a circuit-print finite element method. The circuit prints may be marks made by circuits in an electromagnetic system. One method may construct circuit prints based on interested circuit nodes on surfaces for three-dimensional (3D) problems and on lines for two-dimensional (2D) problems. In contrast to disadvantageous finite element methods for 3D electromagnetic analysis, which inevitably may involve volumetric unknowns, embodiments of the present invention may limit the unknowns on surfaces only. This may also remove bottleneck problems of large memory requirements and high processor cost as in disadvantageous finite element solutions of large-scale 3D problems. Embodiments of the present invention may preserve the advantages of finite element methods such as flexibility in modeling irregular geometry and the capability in handling arbitrary inhomogeneity.

Embodiments of the present invention may further provide a circuit-print projection-translation algorithm. This may further reduce the solution of multiple circuit prints to a single one. When solving a circuit-print, contributions from the other circuit prints may be projected to this circuit print, and therefore information/data of only a single circuit print may be kept in memory. When solving the coupling (crosstalk) between a circuit print i and another circuit print j, the solution obtained on the circuit print i may be translated to the circuit print j so as to obtain the circuit parameters therein. This may substantially reduce memory requirements. The entire computation may only involve the complexity of solving a single circuit print (i.e., interested circuit-node related surface/line), no matter how large the original problem. The size of this single surface/line may be adaptively set with respect to the available memory and processor resources.

Embodiments of the present invention may also contribute to the development of high-capacity time-domain circuit simulators, i.e., in conventional IC analysis, the distributed RC- or RLC-models may be used to represent the circuits. This approach may generate a tremendous number of circuit elements, which is far beyond the limit that current SPICE-like circuit simulators can handle. Embodiments of the present invention may provide development of high-capacity electromagnetic modeling techniques, circuit-abstracted electromagnetic solutions, surface partial differential equation solvers, circuit-print integral equation solvers, and other parameter-abstracted numerical solutions.

Figure 1:
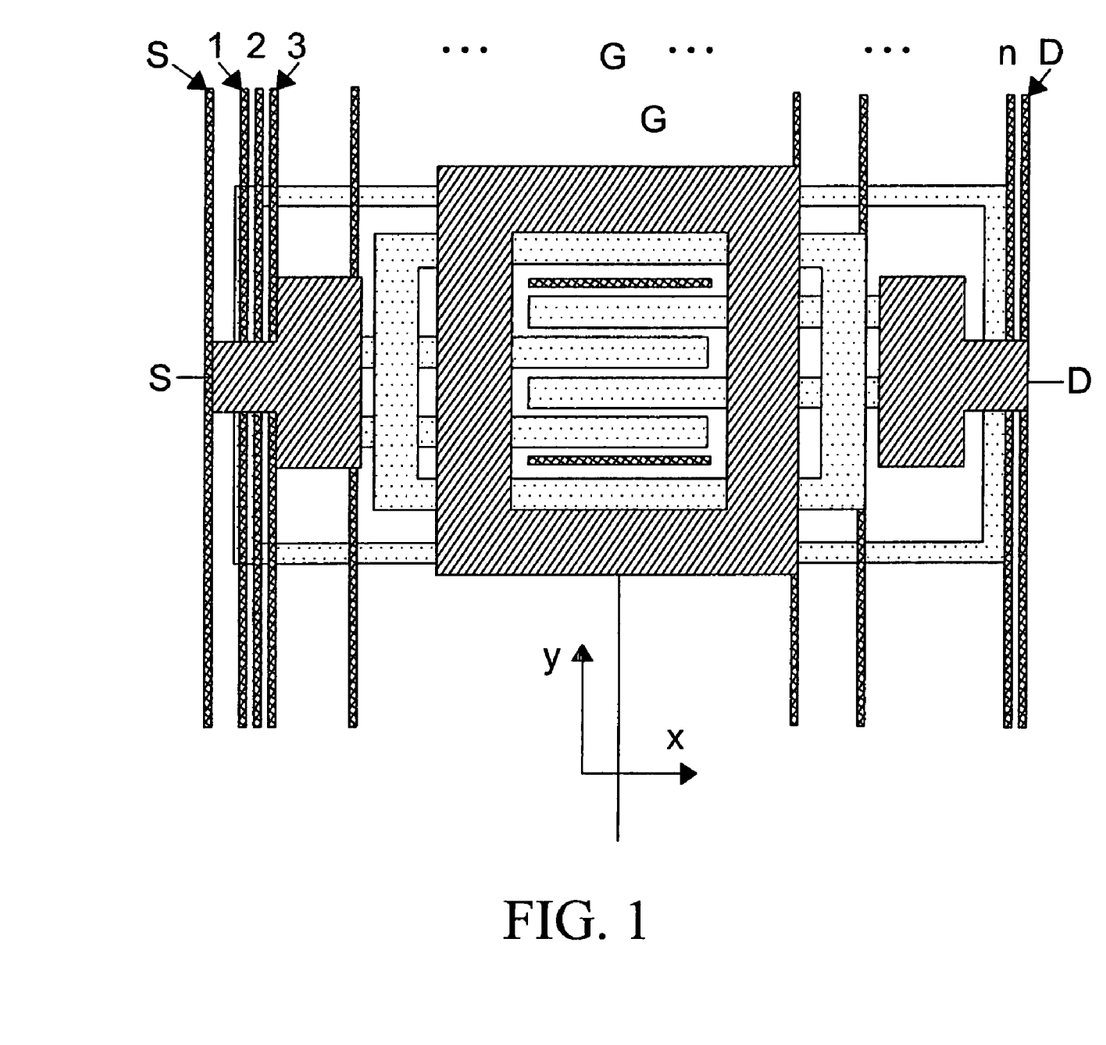
FIG. 1 is a top view of a radio frequency (RF) complementary metal oxide semiconductor (CMOS) metal system according to an example embodiment of the present invention.

A circuit-print finite-element method according to example embodiments of the present invention will now be described with respect to FIGS. 1-3. In order to analyze digital, or mixed-signal or RF circuits (such as in an RF CMOS), a global on-chip power delivery system, and an RF IC circuit), a numerical algorithm may be formulated to solve Maxwell's equations therein. The solution of Maxwell's equations is the E field or H field at discretized points inside a computational domain. However, the design parameters of integrated circuits are circuit parameters, such as SPICE net lists, Z-parameters, Y-parameters, or S-parameters at terminals/ports of interest. Therefore, instead of formulating an electromagnetic solution at any point inside the circuit structure, a circuit abstraction of the original Maxwell's system may be formulated. This circuit abstraction may result in a system that only involves fields that contribute to a final circuit parameter extraction. The fewer the number of unknown fields in the circuit parameter extraction, the smaller the abstracted system, and hence the more efficient the simulation. The circuit-print finite-element method may be such an efficient circuit abstraction of electromagnetic systems.

A circuit parameter extraction technique may be provided that only involves surface field unknowns. These surfaces may contribute to the final circuit extraction as circuit prints because they are considered essential marks made by circuits in an electromagnetic system.

A computational domain may be sliced into multi-surfaces. Note that these surfaces can be made conformal to the structures being investigated. For example, FIG. 1 is a top view of a radio frequency (RF) CMOS metal system according to an example embodiment of the present invention. Other embodiments and configurations are also within the scope of the present invention. In this example, circuit parameters of interest may be a SPICE net list between a source (S) and a drain (D), a gate (G) and the source (S), and the gate (G) and the drain (D). To obtain the circuit parameters, a series of surfaces may be determined by slicing the computational domain. The black solid lines in FIG. 1 show the surfaces. These surfaces lie in a Y-Z plane, which is chosen rather than an X-Y plane, or an X-Z plane, or other planes because a resultant cross section of the Y-Z plane has a smallest dimension. This may thereby yield a smallest number of unknowns.

Two classes of surfaces may be generated from the sliced multi-surfaces, namely essential circuit prints and backfill circuit prints. Essential circuit prints are generated at locations where the circuit parameters are extracted. For example, surfaces S, G, and D are essential circuit prints because they are needed to extract source, gate, and drain circuit parameters from field solutions. On the other hand, backfill circuit prints may be generated to partition unknowns. For example, in FIG. 1, the surfaces 1, 2, 3 ..., and n may be considered backfill circuit prints.

Discretization may then be performed. That is, the computational domain may be discretized either in tetrahedral (for irregular structures) or prism elements (if the mesh can be extruded). Because of the pre-defined surfaces, the mesh may automatically partitioned at these surfaces.

A surface-based finite-element scheme may then be performed to eliminate the volume unknowns. For example, the volume unknowns between the surface 1 and the surface 2 (of FIG. 1) may be eliminated by using a procedure as shown in FIG. 2. More specifically, FIG. 2 shows a procedure of eliminating volume unknowns according to an example embodiment of the present invention. Other embodiments and procedures are also within the scope of the present invention.

Figure 2:
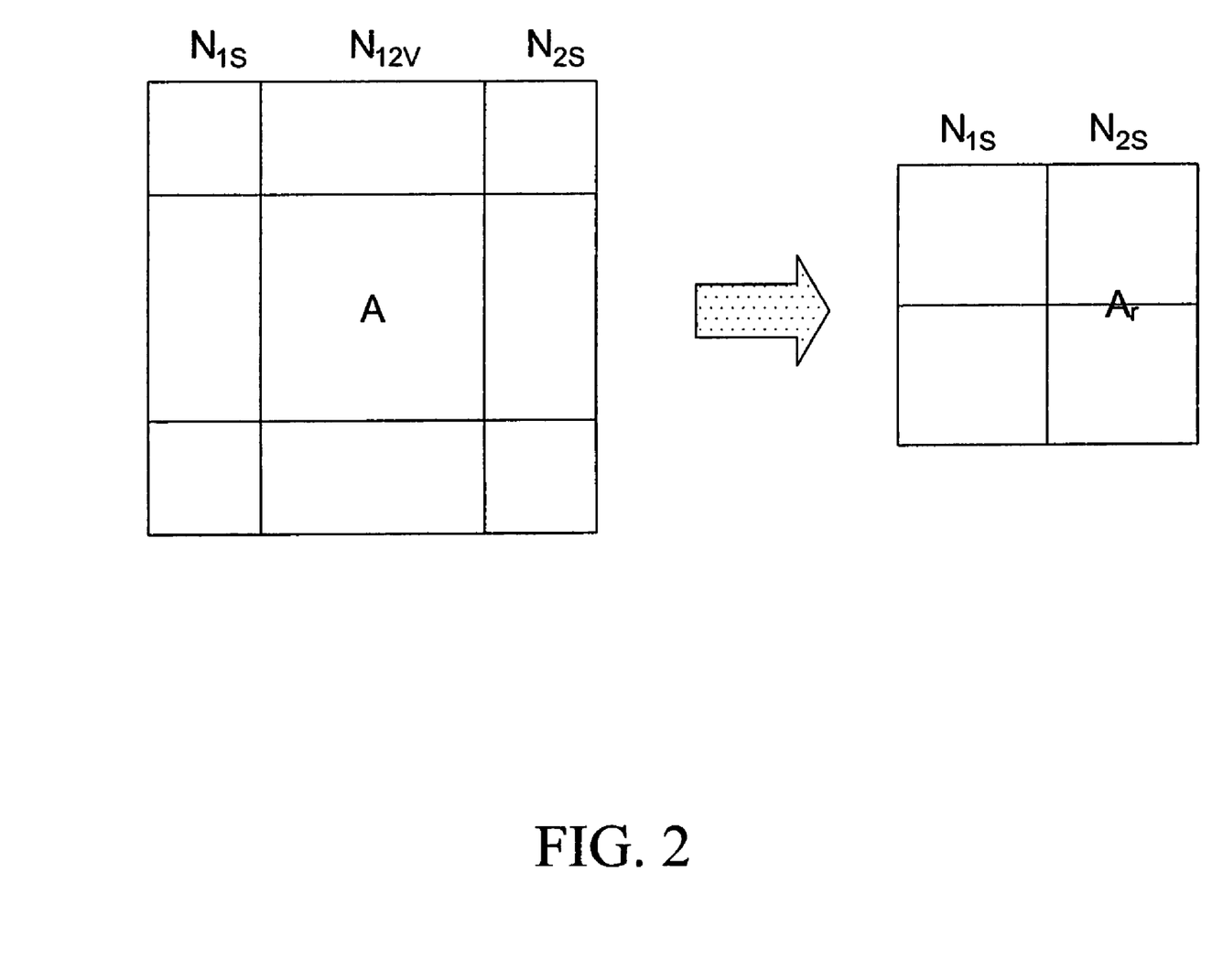
FIG. 2 shows a procedure of eliminating volume unknowns according to an example embodiment of the present invention.
Figure 3:
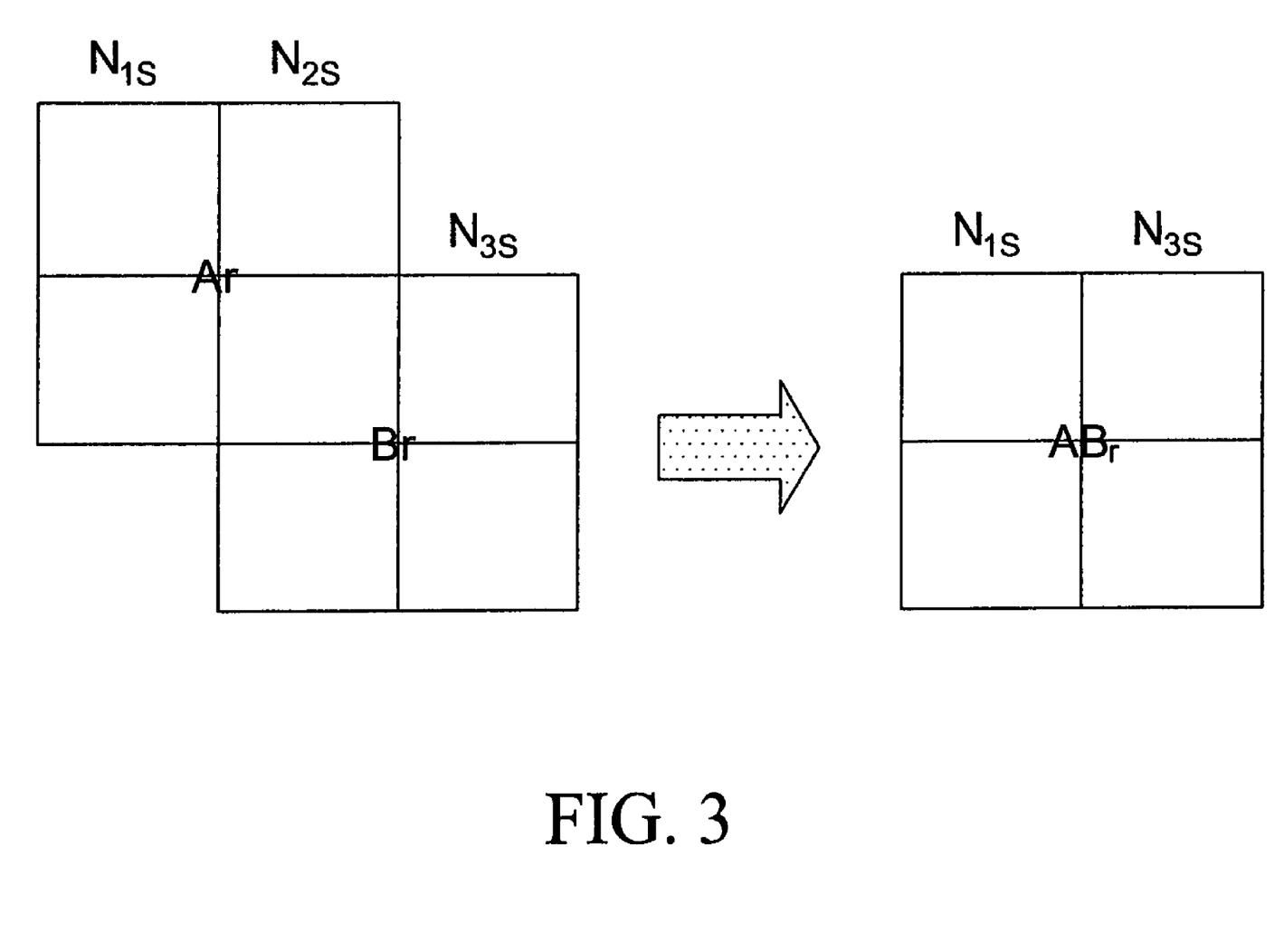
FIG. 3 shows a procedure of eliminating surface unknowns residing on backfill surfaces according to an example embodiment of the present invention.

The left hand side of FIG. 2 shows an original sub-matrix A and the right hand side of FIG. 2 shows a resulting matrix $A_r$. The original sub-matrix A is formed by unknowns residing between the surface 1 and the surface 2, and unknowns on each of the surfaces 1 and 2. In the figure, $N_{1s}$ represents unknowns on the surface 1, $N_{2s}$ represents unknowns on the surface 2, and $N_{12}$ represents volume unknowns between the surface 1 and the surface 2. In this extraction procedure, $N_{12V}$ may be eliminated because it is not needed for circuit extraction. Accordingly, the original sub-matrix A may be reduced to the matrix $A_r$. The matrix $A_r$ only includes unknowns residing on the surface 1 and the surface 2.

As can be seen by the above example, the coupling between the volume unknowns and the surface unknowns may be used to eliminate the volume unknowns. The computational complexity of this matrix reduction may be proportional to the number of volume unknowns between the surface 1 and the surface 2. This is one reason why backfill circuit prints may be introduced even though the backfill circuit prints do not directly contribute to the final circuit extraction (i.e., when the problem is large, one can use backfill circuit prints to partition unknowns to perform the reduction in each small region).

The above procedure shown with respect to FIG. 2, may be repeated in order to eliminate the volume unknowns between the surfaces 2 and 3, the surfaces 3 and 4 and the surfaces n−1 and n. With all the volume unknowns eliminated, the final matrix may only include unknowns on surfaces. As compared to disadvantageous volumetric finite element methods, this may constitute a significant improvement as it drastically reduces the number of unknowns.

Since backfill surfaces may not be relevant to circuit extraction, the backfill surfaces may also be eliminated. The elimination can be done using a procedure as shown in FIG. 3. More specifically, FIG. 3 shows a procedure of eliminating surface unknowns residing on backfill surfaces according to an example embodiment of the present invention. Other embodiments and procedures are also within the scope of the present invention. FIG. 3 shows how to eliminate unknowns residing on the backfill surface 2. In FIG. 3, the matrix $A_r$ represents the unknowns on the surface 1 and the surface 2. Likewise the matrix $B_r$ represents the unknowns on the surface 2 and the surface 3. In a similar manner as discussed above with respect to FIG. 2, the unknowns on backfill surface 2 may be eliminated, which results in the matrix $AB_r$. Other backfill surfaces may be similarly eliminated and therefore will not be described in detail.

Once all of the backfill surfaces have been eliminated, the final matrix system may only involve unknowns residing on three essential surfaces, namely the source S, the ground G and the drain D. These surfaces may be readily solved.

Figure 4:
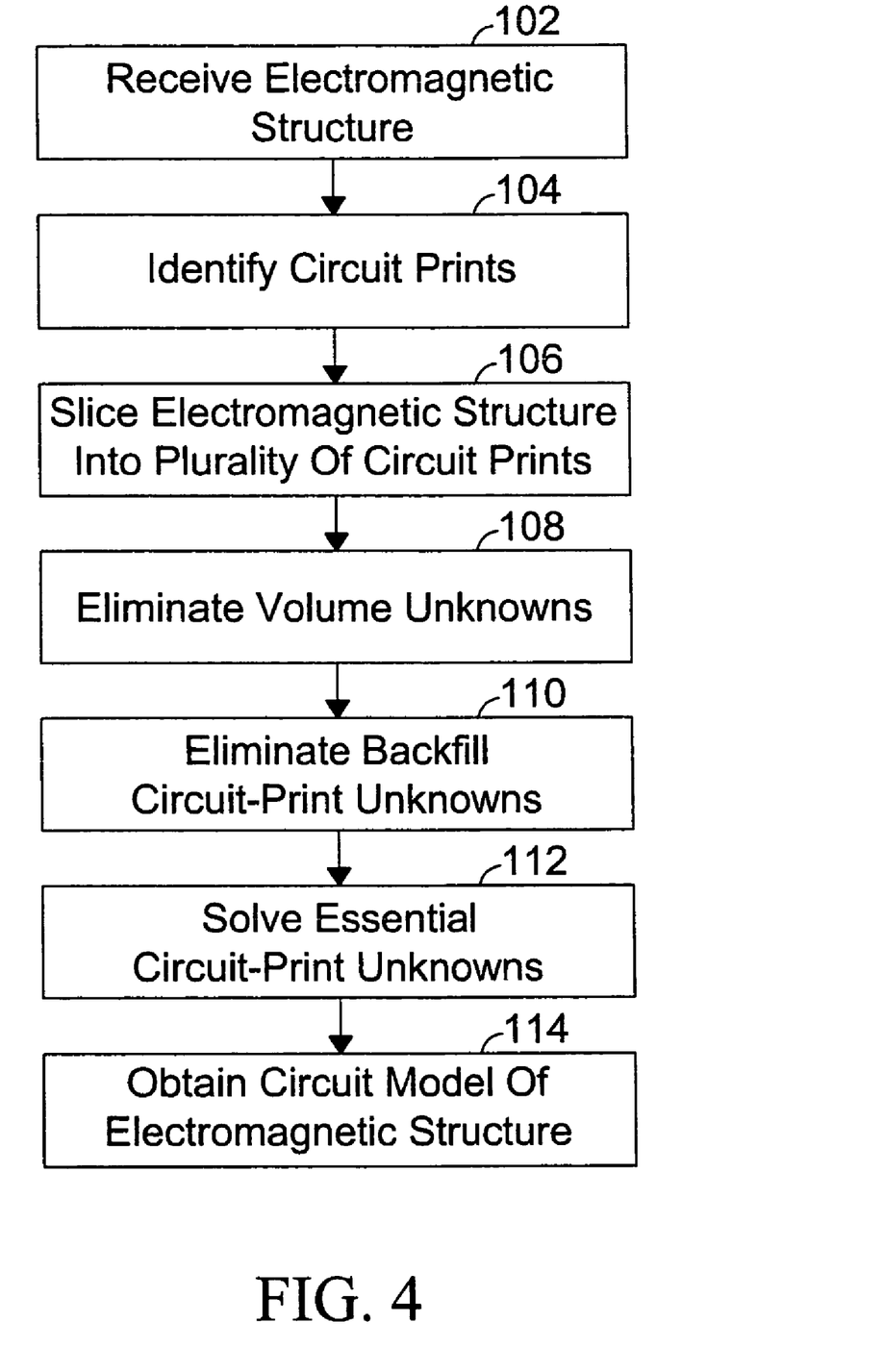
FIG. 4 is a flow chart showing operations according to an example embodiment of the present invention.

FIG. 4 is a flow chart showing operations according to an example embodiment of the present invention. Other embodiments, operations and orders of operations are also within the scope of the present invention. More specifically, FIG. 4 shows that in block 102 an electromagnetic structure may be received. In block 104, circuit prints may be identified. In block 106, the electromagnetic structure may be sliced into a plurality of circuit prints (including essential circuit prints and backfill circuit prints). Volume unknowns may be eliminated in block 108. This may be done in a manner similar as discussed above with respect to FIG. 2. In block 110, backfill circuit-print unknowns may be eliminated. This may be done in a similar manner as discussed above with respect to FIG. 3. Essential circuit-print unknowns of the electromagnetic structure may be solved in block 112. A circuit model of the electromagnetic structure may be obtained in block 114.

A circuit-print projection-translation algorithm according to an example embodiment of the present invention will now be described. As discussed above, the surface-based circuit-print finite-element method according to an example embodiment of the present invention may significantly reduce the computational complexity of 3D problems. A circuit-print projection-translation algorithm may be provided for further efficiency.

Figure 5:
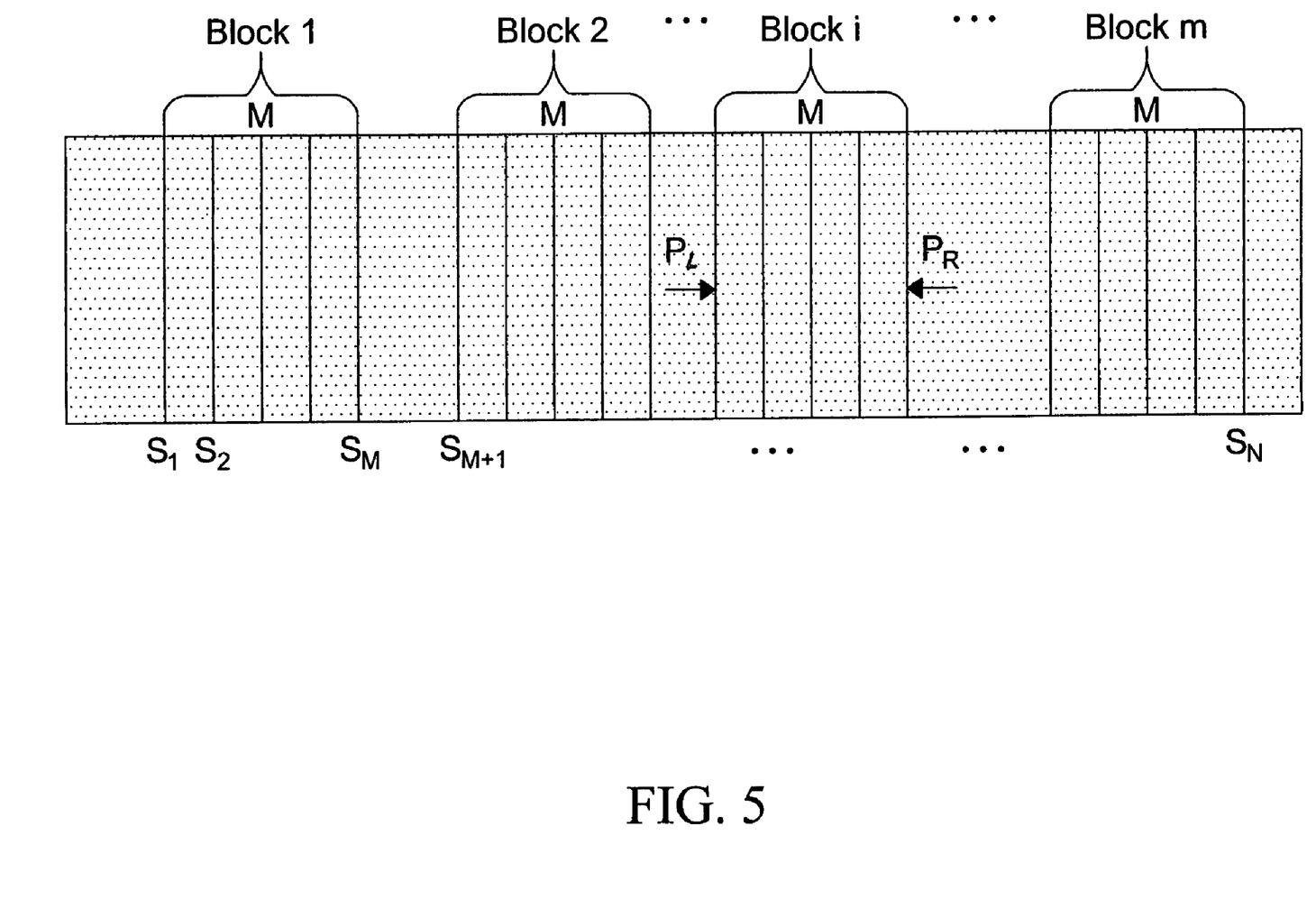
FIG. 5 shows multi-surfaces divided into blocks according to an example embodiment of the present invention.

In a circuit-print projection-translation algorithm, memory and processor resources may be determined in order to determine how many circuit prints (e.g., surfaces for three-dimensional problems) can be directly solved. For example, if only M surfaces can be solved with available computational resources, then the original N surfaces can be divided into multiple blocks as shown in FIG. 5. More specifically, FIG. 5 shows multi-surfaces divided into blocks according to an example embodiment of the present invention. Other embodiments and configurations are also within the scope of the present invention. As shown, an original structure may have N surfaces ($S_1, S_2 \ldots S_N$). Due to computational resources, the N surfaces may be divided into m number of blocks where each block has at most M surfaces (M is greater than or equal to 1).

Figure 6:
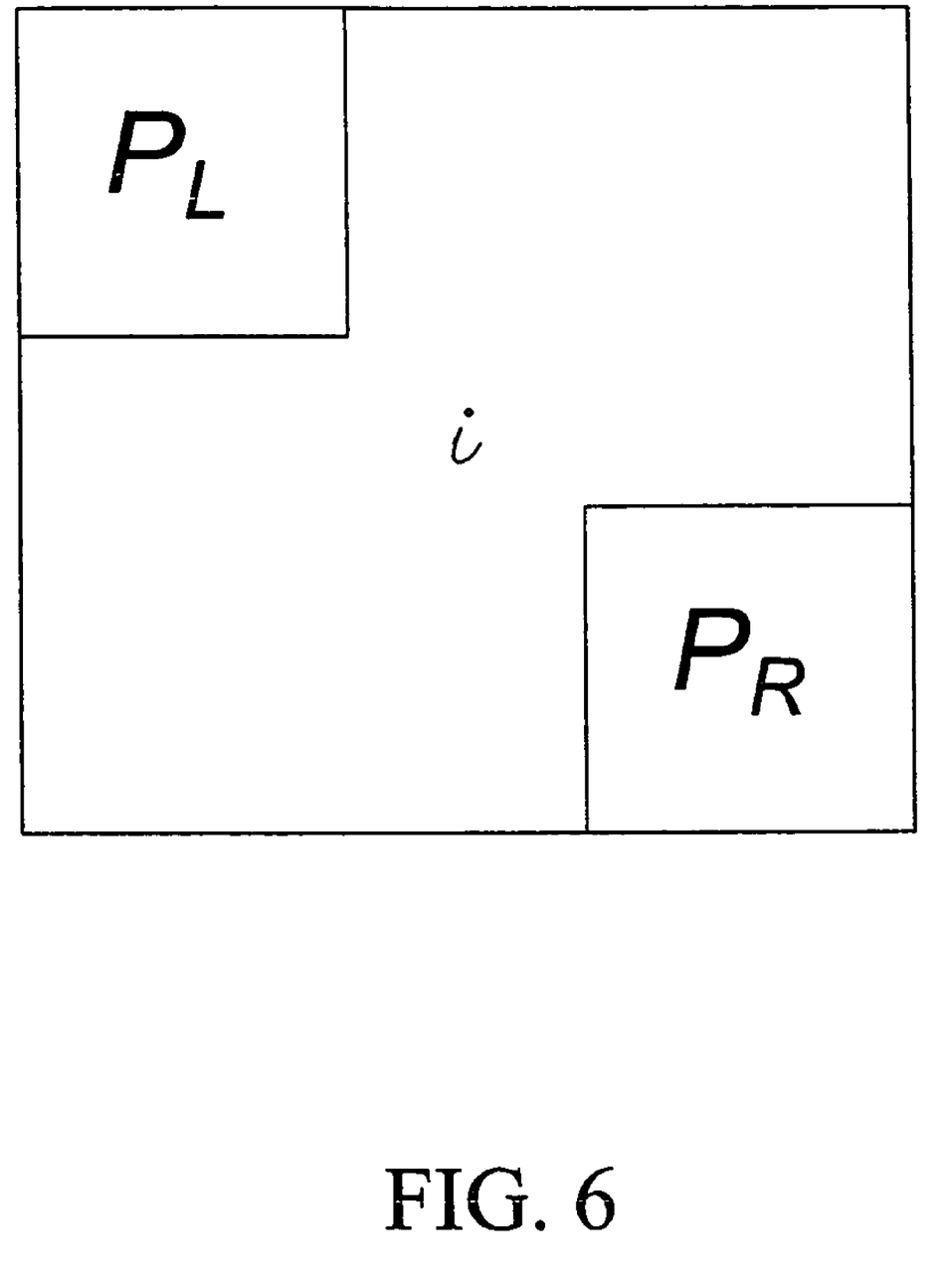
FIG. 6 shows projections being contributed to a block according to an example embodiment of the present invention.

Each separate block may be solved in turn. When one block is being solved, the contributions from other blocks may be projected to this block and therefore information regarding only one block may be stored in the memory. For example, in FIG. 5, $P_L$ represents a projection from blocks to the left of block i, and $P_R$ represents a projection from the blocks to the right of block i. Mathematically the projections $P_R$ and $P_L$ are equivalent to superimposing two sub-matrices resulting from $P_L$ and $P_R$ projections on the original matrix of the block i as shown in FIG. 6. More specifically, FIG. 6 shows projections being contributed to a block (i.e., the block i) according to an example embodiment of the present invention. Other embodiments are also within the scope of the present invention.

When the block i is solved, the unknowns on the M surfaces residing in the block i may be known. To obtain the unknowns on other surfaces that lie in the other blocks (i.e., other than block i), the solution to the block i may be translated to other blocks as shown in FIG. 7.

Figure 7:
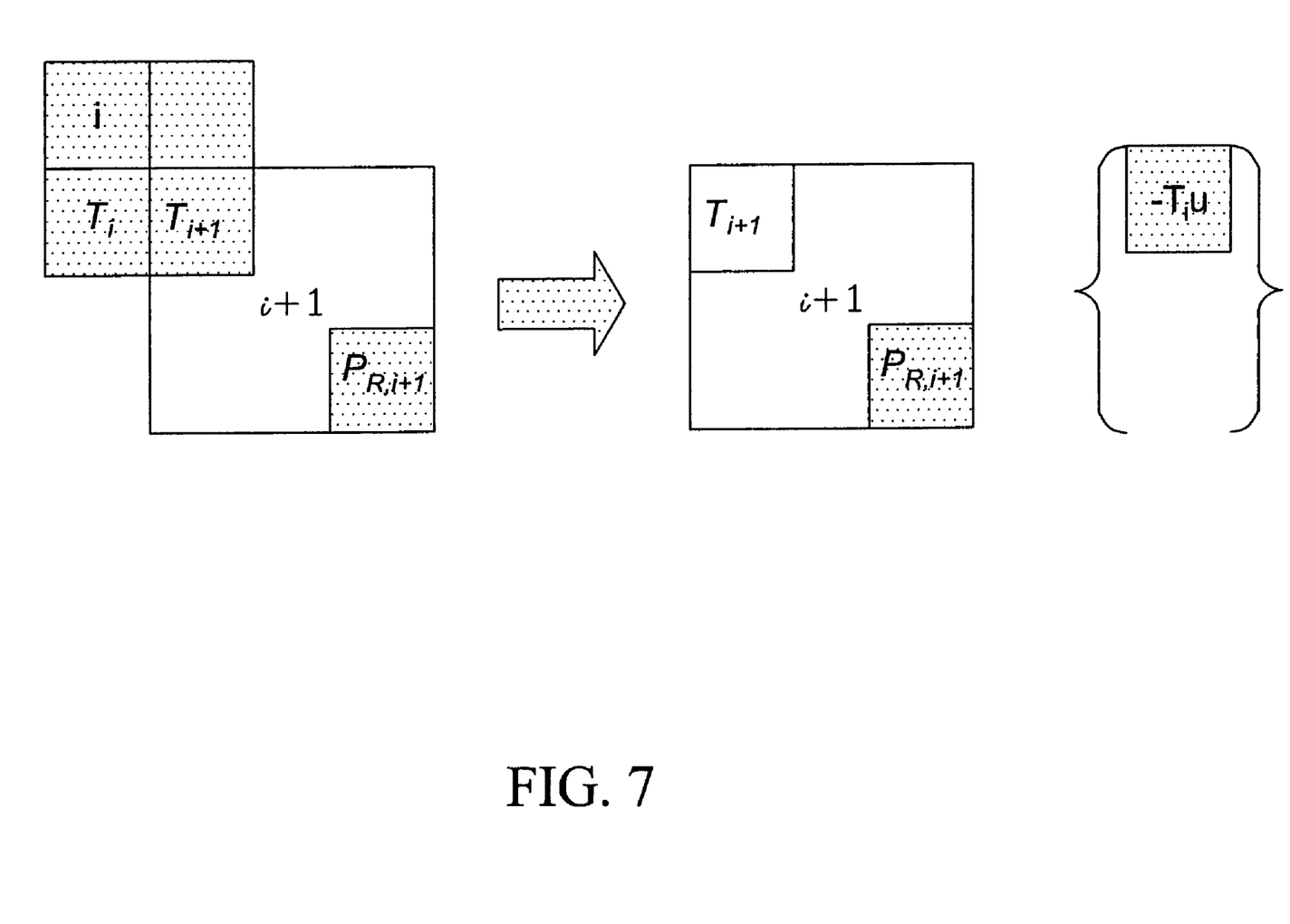
FIG. 7 shows a procedure to solve other blocks using translation and projection according to an example embodiment of the present invention.

FIG. 7 shows a procedure to solve other blocks using translation and projection according to an example embodiment of the present invention. Other embodiments and procedures are also within the scope of the present invention. For example, to extract unknowns residing in block (i+1), contributions may be projected from the blocks to the right of the (i+1)-th block to the block (i+1). Mathematically this may resemble superimposing a sub-matrix $P_{R,i+1}$ on the original sub-matrix of block (i+1). Additionally, the solution of the i-th block may be translated to the (i+1)-th block. This may be equivalent to assembling a translation sub-matrix T. That is, in FIG. 7, the translation operator $T_i$ works on a rightmost surface of block i, and the translation operator $T_{i+1}$ works on a leftmost surface of block (i+1). With the solution in the block i known, the matrix system in FIG. 7 may be transformed to that shown on the right hand side of FIG. 7. Accordingly, M surface unknowns may be solved irrespective of the original problem size so as to obtain the solution in block (i+1). Additionally, the translation operator T can be constructed for other surfaces in block i rather than the rightmost surface as long as the field solutions used to translate to other blocks are chosen from this surface. The projection and the translation process may resemble the procedure shown in FIG. 3. To project or translate one surface to the other may be similar to eliminating the intermediate surface unknowns.

By repeating the above procedure, unknowns in all of the blocks, and on all of the surfaces may be solved. As a result, the circuit parameters of the entire system can be extracted. As may be seen from this algorithm, no matter how large the original problem, embodiments of the present invention may reduce a computational complexity to a smaller problem that may be handled using available computational resources. Through translation and projection, embodiments of the present invention may then solve multiple small problems to obtain the solution of the original large-scale problem.

Figure 8:
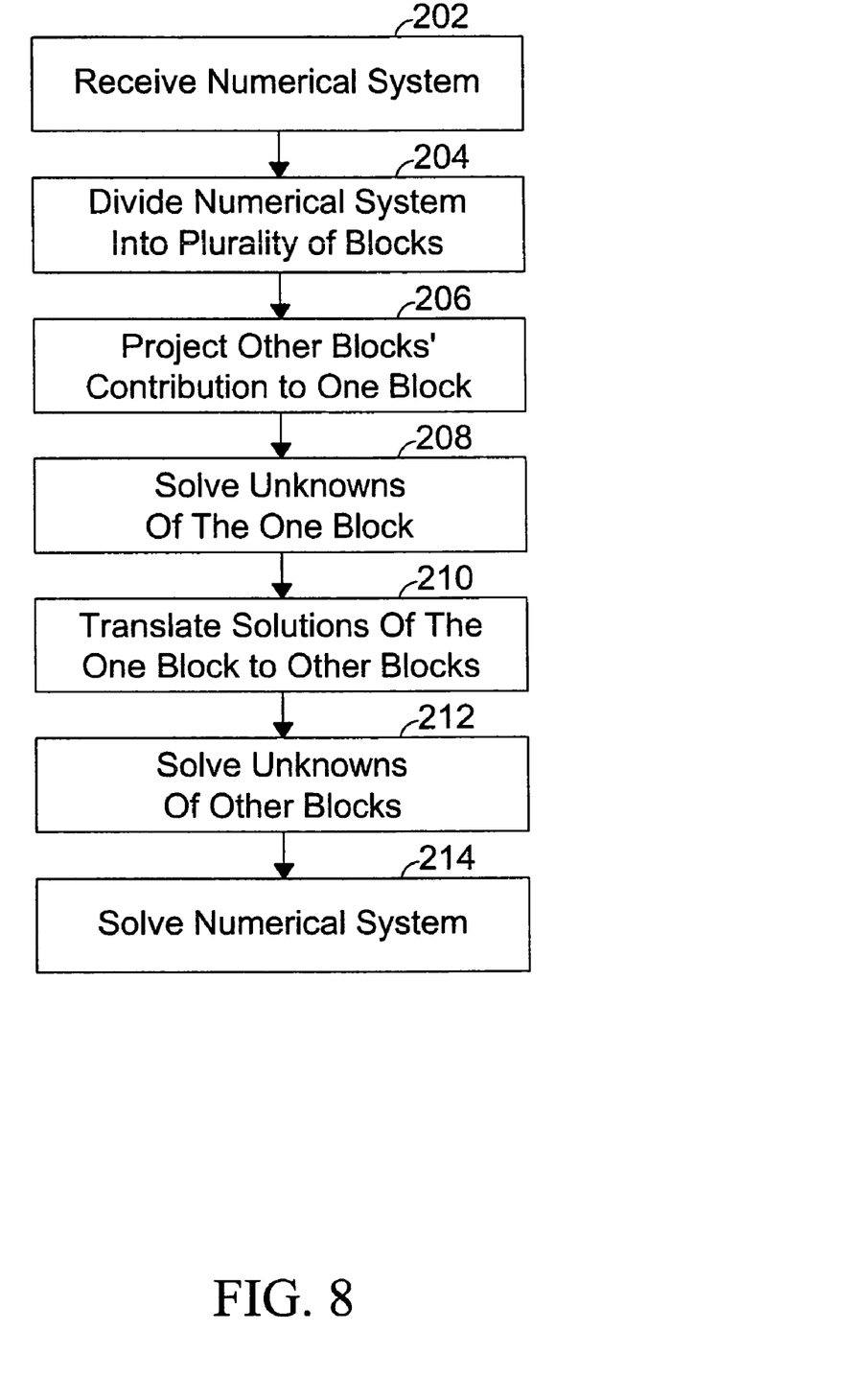
FIG. 8 is a flow chart showing operations according to an example embodiment of the present invention.

FIG. 8 is a flow chart showing operations according to an example embodiment of the present invention. Other embodiments, operations and orders of operations are also within the scope of the present invention. More specifically, FIG. 8 shows that in block 202 a numerical system of a structure may be received. In block 204, the numerical system may be divided into a plurality of blocks. This may be determined based on an amount of available memory space. Unknowns of one of the divided blocks may be determined by projecting the contribution from other blocks to this block in block 206, and then solving the unknowns of the one block in block 208. This may be solved in a similar manner as discussed above. In block 210, solutions of the one solved block may be translated to other blocks of the divided numerical system, and unknowns of the other block may be solved in block 212. This may be done in a similar manner as discussed above with respect to FIGS. 6-7. The entire numerical system may be solved in block 214. This may involve determining circuit characteristics of the structure.

Embodiments of the present invention may provide a method that breaks through problem-size limits in computational electromagnetics for high-frequency IC design. This method may solve large-scale (i.e., full-chip-scale IC) problems with full-wave accuracy. Embodiments of the present invention may provide a rigorous divide-and-conquer algorithm that can solve large-scale IC problems. An underlying principle may be that one cannot solve an infinitely large problem; however, one can solve smaller problems. From solutions of multiple smaller problems, a solution of the original larger problem may be accurately determined. Full-wave full-chip analyses may therefore be feasible.

Embodiments of the present invention may be implemented in a computer program, for example, a full-wave IC simulator implemented in a CAD tool. As such, these embodiments may be stored on a storage medium having stored thereof instructions that can be used to program a computer system to perform embodiments of the present invention as discussed above. The storage medium may include, but is not limited to, any type of disk including floppy disks, optical disks, compact disk read-only memories (CD-ROMs), compact wireless rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 9:
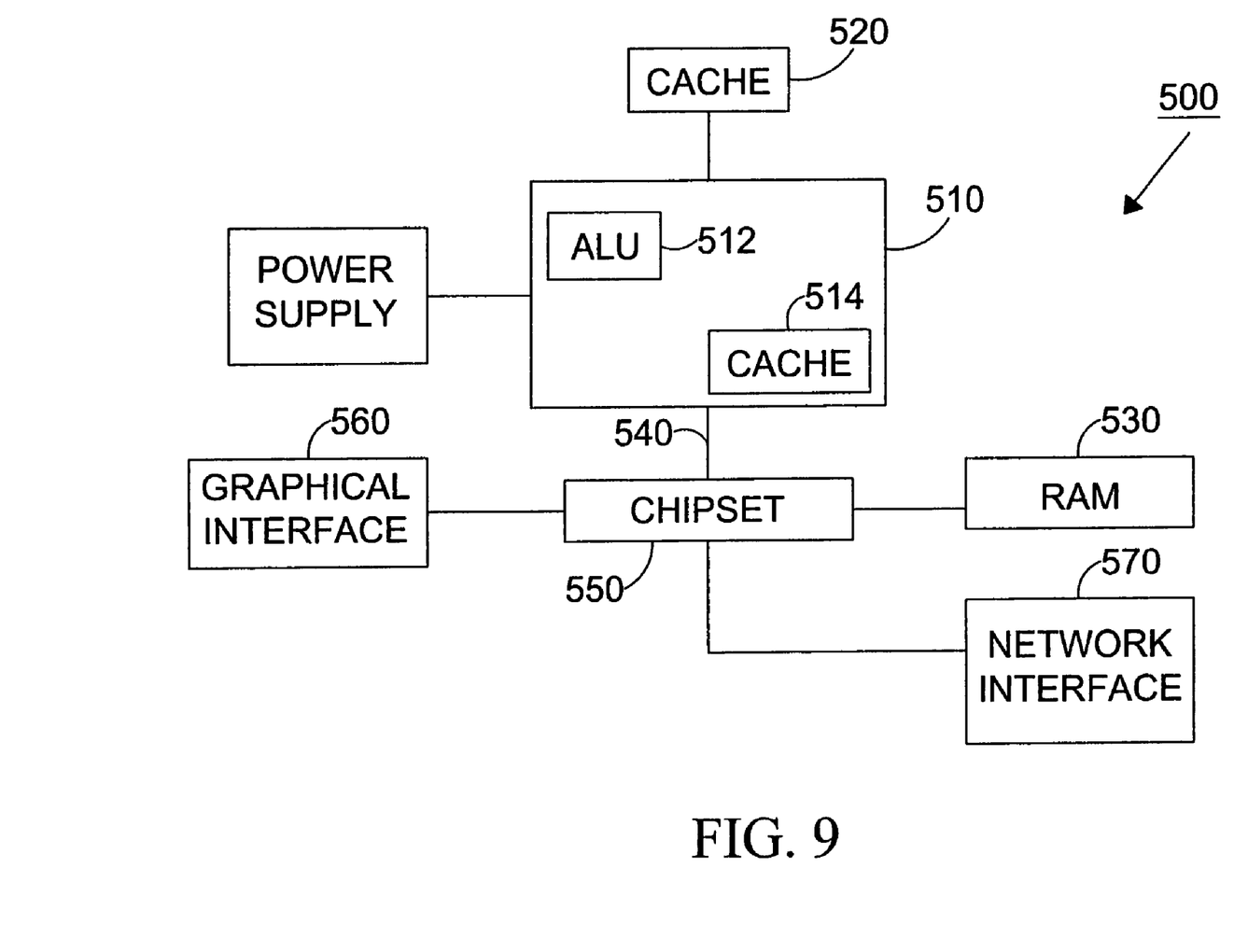
FIG. 9 is a block diagram of a system that includes an example embodiment of the present invention.

Embodiments of the present invention (or portions of embodiments) may be implemented in software for execution by a suitable data processing system configured with a suitable combination of hardware devices. FIG. 9 is a block diagram of a representative data system, namely a computer system 500, in which embodiments of the present invention may be used. Other embodiments and configurations are also within the scope of the present invention. More specifically, the computer system 500 may include a processor 510 that may have many sub-blocks such as an arithmetic logic unit (ALU) 512 and an on-die (or internal) cache 514. The processor 510 may also communicate to other levels of cache, such as off-die cache 520. Higher memory hierarchy levels such as a system memory (or RAM) 530 may be accessed via a host bus 540 and a chip set 550. The system memory 530 may also be accessed in other ways, such as directly from the processor 510 and/or without passing through the host bus 540 and/or the chip set 550. In addition, other off-die functional units such as a graphics interface 560 and a network interface 570, to name just a few, may communicate with the processor 510 via appropriate busses or ports. The system may also include a wireless interface to interface the system 500 with other systems, networks, and/or devices via a wireless connection. The various techniques discussed above may be performed by the system 500. Additionally, the system 500 may include a display device coupled to the processor to display information relating to the various operations discussed above (such as the computational model).

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Further, certain method procedures may have been delineated as separate procedures; however, these separately delineated procedures should not be construed as necessary order dependent in their performance. That is, some procedures may be able to be performed in an alternative ordering, simultaneously, etc.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. A computer-implemented modeling method, wherein the computer performing the following method comprising:
   receiving an electromagnetic structure;
   identifying circuit prints;
   slicing the electromagnetic structure into a plurality of circuit prints;
   eliminating volume unknowns between circuit prints of the electromagnetic structure;
   solving circuit-print unknowns of the electromagnetic structure; and
   determining circuit characteristics of the electromagnetic structure.

2. The modeling method of claim 1, wherein the electromagnetic structure comprises one of a digital, analogue, mixed-signal or radio frequency (RF) circuit, platform, and system.

3. The modeling method of claim 1, wherein the circuit prints comprise surfaces or lines related to interested circuit nodes conformal to the electromagnetic structure being investigated.

4. The modeling method of claim 1, further comprising eliminating backfill circuit-print unknowns prior to solving circuit-print unknowns of the electromagnetic structure.

5. The modeling method of claim 1, further comprising dividing the electromagnetic structure into a plurality of blocks prior to slicing the electromagnetic structure into the plurality of circuit prints.

6. The modeling method of claim 1, wherein solving circuit-print unknowns includes projecting contributions from other blocks to one block, solving circuit-print unknowns of the one block, and translating solutions of the one block to other blocks of the electromagnetic structure.

7. The modeling method of claim 1, wherein slicing the electromagnetic structure includes slicing the electromagnetic structure into essential circuit prints and backfill circuit prints.

8. The modeling method of claim 1, wherein solving circuit-print unknowns includes determining circuit parameters at locations corresponding to the circuit-print unknowns.

9. A computer-implemented modeling method, wherein the computer performing the following method, comprising:
receiving a numerical system;
dividing the numerical system into a plurality of blocks;
projecting contributions from other blocks to one of the blocks of the numerical system;
solving unknowns of the one block by:
slicing the one block into a plurality of circuit prints,
eliminating volume unknowns or backfill circuit-print unknowns within the one block,
projecting contributions from other blocks to the one block, and
solving circuit-print unknowns within the one block after eliminating the volume unknowns of the backfill circuit-print unknowns, and solving the circuit-print unknowns includes determining electromagnetic and circuit characteristics of the numerical system;
translating the solved unknowns of the one block to other blocks of the numerical system; and
solving unknowns of the other blocks.

10. The modeling method of claim 9, wherein the numerical system comprises one of an electromagnetic system and a circuit system.

11. The modeling method of claim 9, further comprising determining electromagnetic and circuit characteristics based on the solved unknowns and the translated solved unknowns.

12. The modeling method of claim 9, further comprising determining an amount of available memory space.

13. The modeling method of claim 12, wherein dividing the numerical system includes dividing the numerical system based on the determined amount of available memory space.

14. A machine-readable storage medium having stored therein instructions that when executed cause a machine to perform a method comprising:
identifying circuit prints of a structure;
slicing a numerical system of the structure into a plurality of circuit prints;
eliminating volume unknowns and backfill circuit-print unknowns between circuit prints of the numerical system; and
after eliminating volume unknowns and backfill circuit-print unknowns, solving circuit-print unknowns of the numerical system to determine electromagnetic or circuit characteristics of the numerical system.

15. The machine-readable storage medium of claim 14, wherein the structure comprises one of a digital, analogue, mixed-signal or RE circuit, platform, system, and an electromagnetic system.

16. The machine-readable storage medium of claim 14, the method further comprising dividing the numerical system into blocks of the numerical system prior to slicing the numerical system into circuit prints.

17. The machine-readable storage medium of claim 14, wherein solving circuit-print unknowns includes projecting contributions from other blocks to one block, solving circuit-print unknowns of the one block and translating solutions of the one block to other blocks of the numerical system.

18. A system comprising:
a storage device to store code to slice a computational model of a structure into a plurality of circuit prints, to eliminate volume unknowns or backfill circuit-print unknowns between circuit prints of the computational model, and to solve circuit-print unknowns of the computational model after eliminating the volume unknowns or the backfill circuit-print unknowns;
a processor to couple to the storage device to execute the code; and
a display device to couple to the processor to display information relating to the computational model.

19. The system of claim 18, wherein the code to solve the circuit-print unknowns includes the code to determine electromagnetic and circuit characteristics of the computational model.

20. The system of claim 18, wherein the code to further divide the computational model into blocks of the computational model prior to slicing the computational model into circuit prints.

21. The system of claim 18, wherein the code to solve circuit-print unknowns includes the code to project the contributions from other blocks to one block, to solve circuit-print unknowns of one block and to translate solutions of the one block to other blocks of the computational model.

* * * * *